Oct. 26, 1965  W. E. SCHWERDTFEGER ETAL  3,214,005
BALE DIVERTER
Filed May 31, 1962  3 Sheets-Sheet 1

INVENTORS
WILBUR E. SCHWERDTFEGER
CHARLES V. EVERETT
EDWARD SVEREIKA
BY
ATTY.

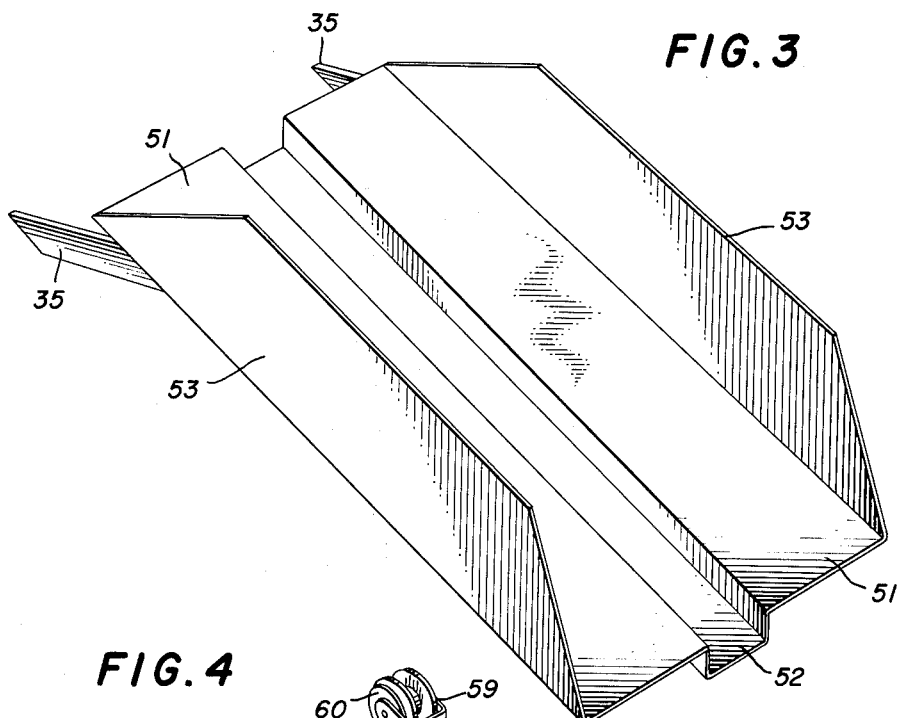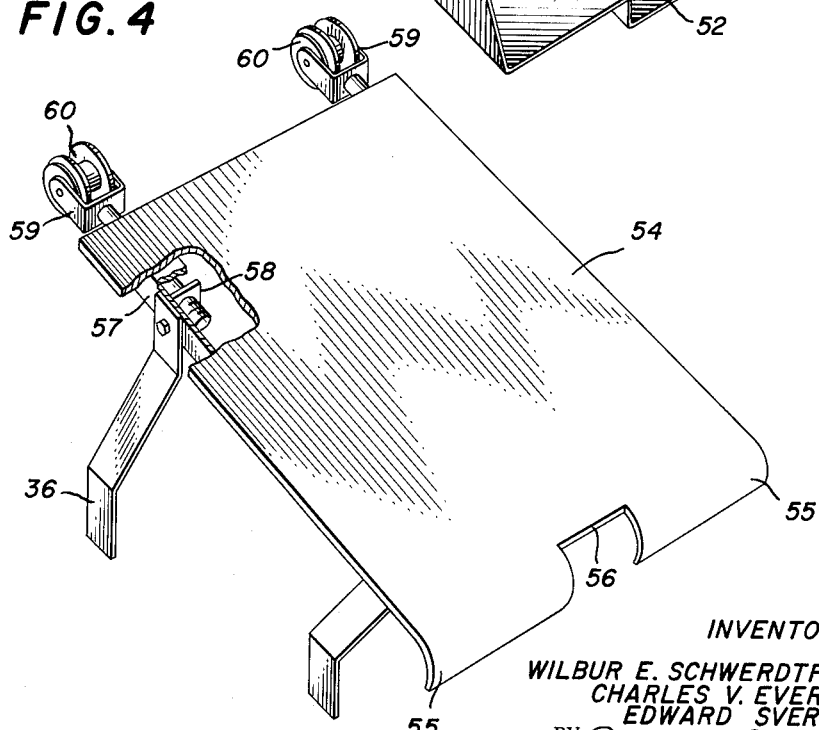

Oct. 26, 1965  W. E. SCHWERDTFEGER ETAL  3,214,005
BALE DIVERTER
Filed May 31, 1962  3 Sheets-Sheet 3

INVENTORS
WILBUR E. SCHWERDTFEGER
CHARLES V. EVERETT
EDWARD SVEREIKA
BY Paul O. Pippel

ATTY.

000
United States Patent Office 3,214,005
Patented Oct. 26, 1965

3,214,005
BALE DIVERTER
Wilbur E. Schwerdtfeger, Western Springs, Charles V. Everett, Warrenville, and Edward Svereika, Chicago, Ill., assignors to International Harvester Company, Chicago, Ill., a corporation of New Jersey
Filed May 31, 1962, Ser. No. 198,832
3 Claims. (Cl. 198—185)

This invention relates generally to improvements in bale diverters and more particularly to a new and improved bale diverter wherein the diverter comprises an inclined plane lying parallel to the longitudinal axis of the conveyor.

In the field of bale diverters it has been a general practice to employ a diverter which constitutes an obstruction to the continued forward movement of the bale and thereby causes the bale to fall off one side or the other of the conveyor. Although such devices have served the purpose, they have not proved to be entirely dependable since bales often fall off the opposite side of the conveyor to that which is intended, or bales will become intertangled with each other on the conveyor and cause a jam. Another objection to the prior art bale diverters is that a particular diverter could handle only a single size of bale.

The general purpose of this invention is to provide a bale inverter which embraces all the advantages of similarly employed bale diverters and possesses none of the aforedescribed disadvantages. To attain this, the present invention contemplates a unique type of bale diverter wherein each individual bale is raised from the surface of the conveyor up an inclined plane and accelerated over the edge of the plane such that it falls on an inclined deflecting board. The inclination of this deflecting board is such that the bale can be diverted to only one side of the conveyor. The entire bale diverter is supported on a carriage which is slidably supported on a conveyor means and the entire diverter can be moved along the conveyor by the manipulation of a pair of ropes, the same ropes are utilized to change the inclination of the deflecting board from one side to the other.

An object of the present invention is the provision of a bale diverter which has positive control of the deflecting board to deflect it to either side of the conveyor.

Another object is to provide a bale deflector that elevates the bale and drops it on a deflecting board which can be positively tilted to either side of the conveyor.

A further object of the invention is the provision of a bale diverter having a two-stage elevating means, the second stage of which accelerates the forward motion of the bale to separate it from the following bales, thus eliminate tangling of the bales.

Still another object is to provide a bale deflector in which the position of the bale deflector along the conveyor, as well as the direction in which the bale is deflected is controlled by a single set of ropes.

Still another object is to provide a bale diverter that is adapted to handle bales of any size.

These and other objects of the invention will become more apparent from the specification and drawings wherein.

Figure 5:
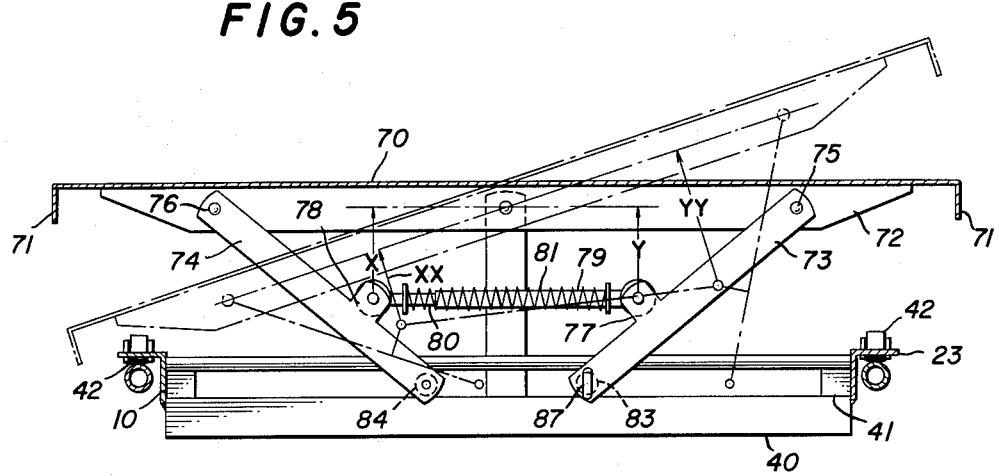

FIGURE 3 a view of the bale guide pan;

FIGURE 4 is a view of the second inclined plane;

FIGURE 5 is an end view of the deflecting board; and

Figure 6:
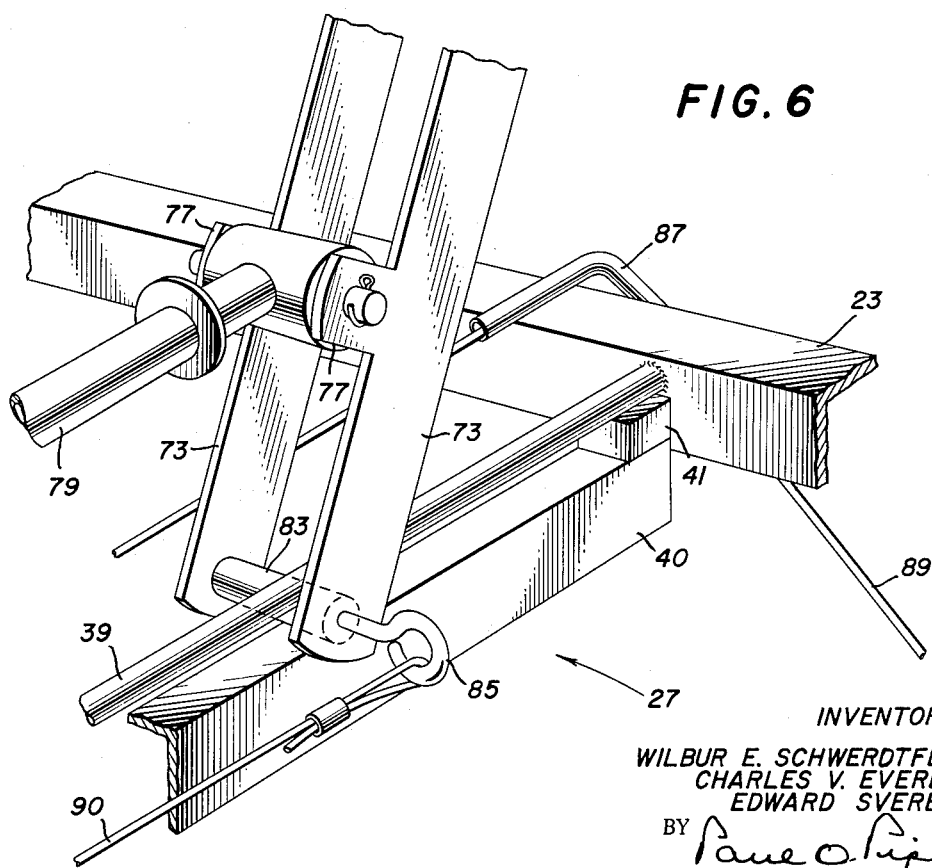

FIGURE 6 is an enlarged view of the arm assemblage of the deflecting board, engaging the slot formed in the carriage.

Figure 1:
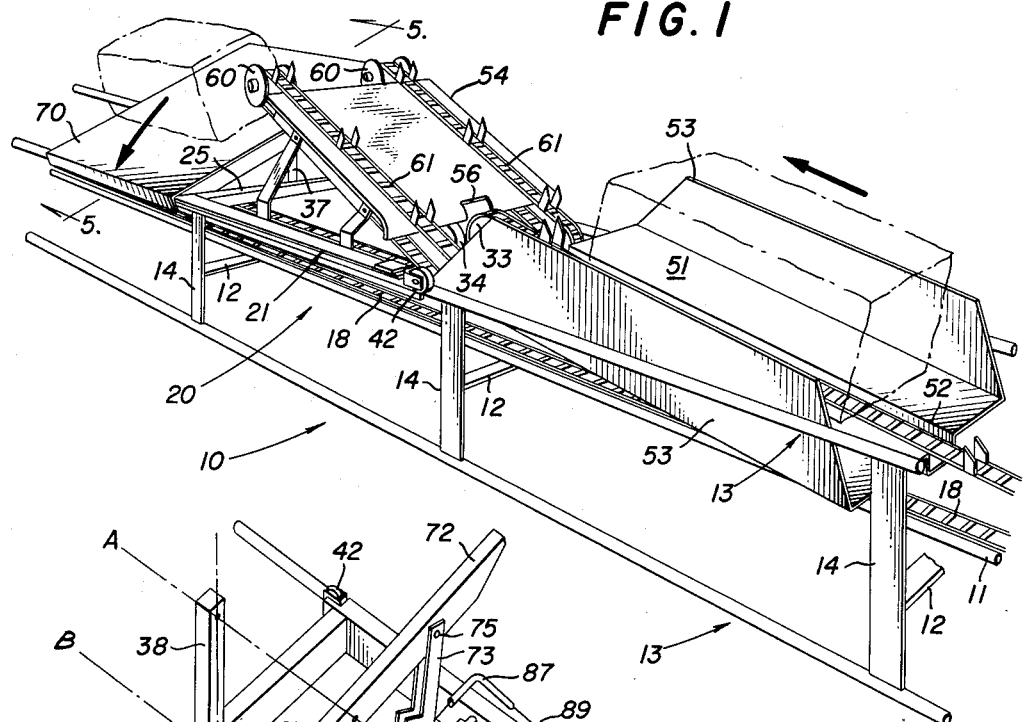
FIGURE 1 is a perspective view showing a horizontal conveyor having the bale diverter mounted thereon.

Referring now to the drawings wherein like reference characters designate like or corresponding parts throughout the several views, there is shown in FIGURE 1 a horizontal conveyor generally designated 10 of the type used to convey bales of hay, said conveyor being made of tubular material. The bottoms of said conveyor comprise a pair of longitudinal struts 11 overlying a plurality of transverse struts 12. The conveyor has two vertical sides comprising vertical struts 14 secured at their mid point to the transverse struts 12 of the bottom. Along the upper and lower extremities of said vertical struts are secured horizontal struts 13 which form the bottom and top of the sides of said conveyor. A continuous chain 18 lies parallel to and between said longitudinal struts of the bottom. This chain has upright spikes 95 which engage the bales to pull them along the conveyor. This conveyor is of conventional design and constitutes no part of the invention herein.

Mounted upon the conveyor is the bale diverter 20, which is the subject of the present invention. This bale diverter constitutes three major parts: the carriage 21, which is supported by the conveyor; an elevator means comprising a first inclined plane 51 and a second inclined plane 54; and a deflecting board 70. As can be seen in FIGURE 1, the bale travels up the first inclined plane 51 being pulled by the continuous chain 18 then up the steeper second inclined plane 54 being pulled by a double-chain assembly 61, and is then dropped or thrown onto the inclined deflecting board 70, which board can be tilted to either side of the conveyor.

Figure 2:
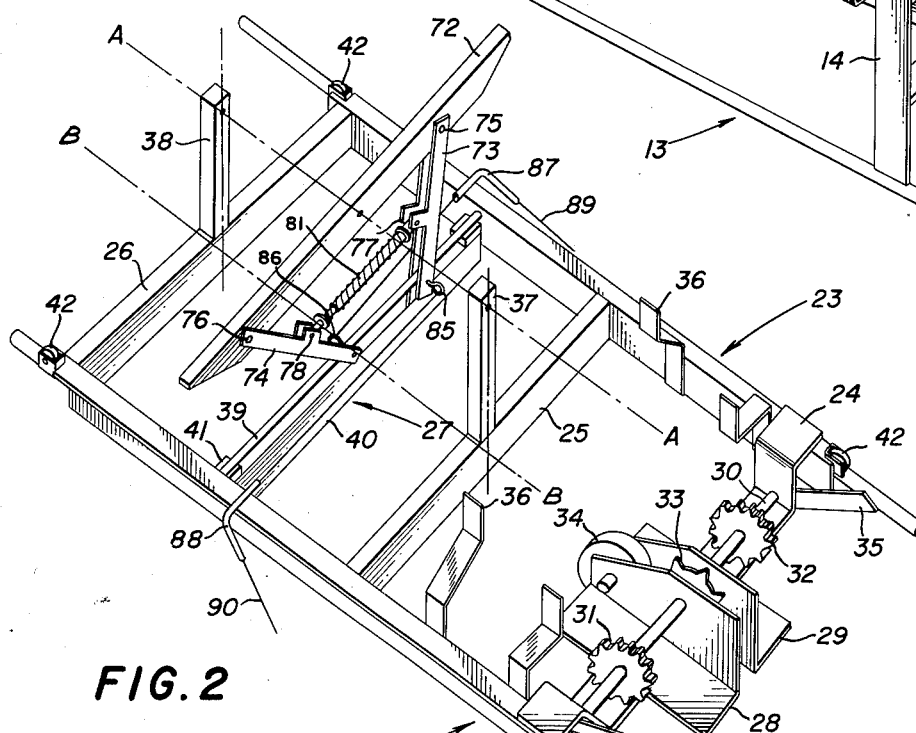
FIGURE 2 is a skeleton view of the bale diverter having the inclined planes and deflecting board removed.

Referring now to FIGURE 2 for a detailed description of the carriage of the bale diverter where line B—B represents the longitudinal axis of said carriage, the carriage comprises a pair of L-shaped longitudinal frame members 22 and 23, connected together by four transverse frame members 24, 25, 26 and 27. Transverse frame member 24 is more specifically called an offset frame member. Mounted on said offset member is a left roller stand 28 and a right roller stand 29 and a shaft 30 journalled in the vertical portions of said offset frame member and extending through the vertical flanges of the left and right roller stands. Mounted on said shaft outwardly of the roller stands is a left sprocket 31 and a right sprocket 32. Also mounted on said shaft between said roller stands is a center sprocket 33. A center roller 34 is mounted between the left and right roller stands forwardly of said center sprocket. The function of the roller 34 and these sprockets shall be further described hereafter. Secured to the offset frame member are a pair of bale guide pan supports 35.

The transverse frame members 25 and 26 have deflecting board post 37 and 38, respectively, extending upwardly from their mid points. The transverse frame member 27, also called the transverse guide way, is shown in detail in FIGURE 6 and comprises a rod 39, a bottom beam 40 spaced downwardly from said rod and a pair of stops 41 spaced inwardly from each end of said rod and bottom beam. The transverse guide way thus forms a slot between the rod, the bottom beam, and the pair of stops.

At each end of the longitudinal frame member 22 and 23 is mounted a bearing or caster 42, as is seen in FIGURES 1 and 2. These bearings or casters engage the horizontal struts 13 of the horizontal conveyor and the carriage is thus freely movable along the conveyor.

As previously stated, the elevator means 50 comprises a first inclined plane or bale guide pan 51. This bale guide pan is shown in FIGURE 3 and comprises a centrally located channel 52 which provides the bale guide pan with means for receiving the continuous chain and also adds rigidity to the bale guide pan. The upright sides 53 of the bale guide pan function to guide the bale up the inclined plane and also provides additional rigidity to the bale guide pan such that the pan can be made from a single piece of sheet material. The bale guide supports 35 connect the upper end of the bale guide pan to the carriage, these supports are seen in FIGURES 2 and 3. The lower edge of the bale guide pan rests on the longitudinal struts 11 of the horizontal conveyor.

The second inclined plane 54 of the elevator means 50 is illustrated in FIGURE 4. The lower edge of this inclined plane is rolled over to form curved edges 55 and a cut-out section 56 is formed in the mid point of said lower edge to permit the passage of the continuous chain 18, which shall be described in greater detail later. Secured to the bottom surface of the second inclined plane 54 are a pair of reinforcing means 57 having mounting means 58 secured to their upper end. Secured to these mounting means are roller brackets 59 which extend beyond and above the upper edge of said inclined plane and have the upper rollers 60 mounted therein. These upper rollers 60, along with the left and right rollers 31 and 32, receive the chain assembly 61 which shall be described in greater detail later.

Referring now to FIGURES 5 and 6 for a description of the deflecting board 70, the deflecting board 70, as seen in FIGURE 5, has turned-down edges 71 which overlie the longitudinal frame members of the carriage and the horizontal struts of the conveyor when said deflecting board is in the inclined position. Secured to the undersurface of said deflecting board is a reinforcing beam 72 as seen in FIGURES 2 and 5. The arm assemblages 73 and 74 are secured to said reinforcing beam about pivots 75 and 76.

As can be best seen in FIGURE 6, each of said arm assemblages comprise parallel strips having lugs 77 and 78 extending therefrom. Pivotally mounted to said lugs 77 and 78 are the telescoping means 79 and 80 having a spring 81 mounted thereon. Said spring 81 tending to force the telescoping means apart and thereby pivot the arm assemblages about their pivots 75 and 76. Secured between the parallel strips of each arm assemblage, at its lower end, are rollers 83 and 84 having eyebolts 85 and 86 (FIG. 2) extending outwardly therefrom. The deflecting board is mounted about an axis A—A, parallel to the longitudinal axis B—B of the carriage, through the deflecting board post 37 and 38, as shown in FIGURE 2. As seen in FIGURE 2 bent tubes 87 and 88 are secured to the longitudinal frame members 22 and 23 of the carriage adjacent the ends of the transverse guideway 27. A pair of cables 89 and 90 are threaded through said bent tubes and the ends thereof are secured to the eyebolts 85 and 86. The function of said cables shall be described in more detail later.

As seen in FIGURE 5 when the deflecting board 70 is in the horizontal position the spring 81 tends to force both arm assemblages 73 and 74 downwardly about their pivots 75 and 76. Since the leverage arm X and Y, as indicated in FIGURE 5, are equal when the deflecting board is in the horizontal position, spring 81 exerts an equal force on each arm assemblage attempting to pivot it about its pivot point. However, if cable 89, which is connected to eyebolt 86, is pulled, thus moving roller 84, as seen in FIGURE 5, to the right and pivoting arm assemblage 74 in a counter-clockwise direction against the action of spring 81, the lever arm X tends to decrease, as illustrated by X—X, and the lever arm Y tends to increase, as illustrated by Y—Y. Thus, once the deflecting board has been pivoted by the cables 89 and 90 past the horizontal position, additional force need not be given to the cables since spring 81 will pivot the arm assemblages the additional amount until stops 41 have been engaged by the nearly vertical arm assemblage. The spring 81 therefore serves to spring bias the deflecting board in a selected position and prevents the unintentional pivoting of the deflecting board to the opposite position.

Referring again to FIGURES 1 and 2 it is seen that the continuous chain 18 is directed up the channel 52 in the bale guide pan and engages the center sprocket 33. Said continuous chain then is guided downwardly under the center roller 34 and continues thereafter in its horizontal position up the conveyor means. Since the left sprocket, the right sprocket and the center sprocket are secured to the shaft 30, when the continuous chain rotates sprocket 33, the left and right sprockets are also rotated. The driven sprockets 31 and 32 constitute the drive means for the chain assemblage 61, which is supported by said sprockets and also by the upper sprockets 60. The number of teeth on the left and right sprockets on shaft 30 is different from that of the center sprocket so that the chain assemblage 61 will be driven at a faster speed than the continuous chain 18. Thus when the spikes of the chain assemblage 61 engage the bale, the bale is pulled from the bale guide pan and separated from the remaining or following bales, thus insuring a spacing between the bales as they climb up the second inclined plane to be dropped on the deflective board 70. This spacing obviously prevents bales from becoming intertangled with each other and causing a jam on the conveyor and the deflecting means. Also since the chain assemblage 61 of the second inclined plane has a double chain, bales will be conveyed up said plane regardless of what position or size they may be, and a small bale that falls to the left or right of the center line of said second inclined plane will nevertheless be conveyed up the elevator and dropped on the deflecting board, as desired.

Since the continuous chain 18 is directed over the center sprocket 33, and the chain is moving in a longitudinal direction along the conveyor, the motion of the chain tends to move the bale deflector along with it. The bale deflector is therefore continuously being biased in an attempt to move it along the conveyor means. This movement is restricted by the cables 89 and 90 which are both secured at their other ends to a fixed point. If it is desired to move the bale deflector along the conveyor means in the direction that the continuous chain is moving, it is only necessary to reelase the other ends of the cable from their fixed point and allow the continuous chain to move the bale deflector down the conveyor to the point desired after which the cables are re-secured to the fixed point. If it is desired to move the bale deflector in the opposite direction, the cables are released from their fixed point and the two are pulled against the action of the continuous chain until the desired position is obtained. The cables are then again secured to the fixed point. Thus it is seen that the cables 89 and 90 are operative to position the bale deflector along the conveyor and also to pivot the deflecting board to one side or the other.

It should be understood that the foregoing disclosure relates to only a preferred embodiment of the invention and that numerous modifications or alterations may be made therein without departing from the spirit and scope of the invention as set forth in the appended claims.

What is claimed is:

1. A diverter mechanism for a conveyor, comprising: a base having a longitudinal axis, a deflecting board pivotally-mounted on said base about the longitudinal axis thereof, a bottom beam a spaced distance below said deflecting board and extending transversely of said conveyor, a first arm assemblage pivotally attached at one of its ends to said deflecting board at one side of said longitudinal axis and at its other end held in sliding contact with said bottom beam, a second arm assemblage pivotally-attached at one of its ends to said deflecting board at the other side of said longitudinal axis and at its other end held in sliding contact with said bottom beam, said pivot attachments of each said arm assemblages being equal distant from said longitudinal axis, each said arm being of equal length and of greater length than the distance separating said deflecting board and said bottom beam, said other ends of said arm assemblages sloping inwardly towards said longitudinal axis when said deflecting board lies in a horizontal plane, and spring means biasing said first and second arm assemblages apart whereby once said deflecting board has been pivoted beyond said horizontal plane said spring means forces said deflecting board into deflecting position and holds said board in said deflecting position.

2. A diverter mechanism for a conveyor, as recited in claim 1, wherein: said spring means biasing said first and said second arm assemblages apart comprises an elongated telescoping member joined at one of its ends to said first arm assemblage and at its other end to said second arm assemblage, and a spring member carried by said telescoping member urging said telescoping member to extended position.

3. A conveyor installation, comprising: a first horizontal conveyor for moving objects from one point to a second point, said first conveyor being operable to move said objects at a base speed, a second, inclined conveyor associated with said first conveyor for elevating said objects from said second point to a third point, said second conveyor being operable to move said objects at a speed greater than said base speed, said first conveyor including a first shaft extending transversely thereof and rotatably mounted thereon at said first point, a second shaft extending transversely of said first conveyor and rotatably mounted thereon at said second point, a sprocket wheel mounted on each said first and said second transverse shafts, a chain-type conveyor forming a continuous loop around both said first conveyor sprocket wheels, said second conveyor including a sprocket wheel on said second transverse shaft, said last-named sprocket wheel having a larger diameter than said sprocket of said first conveyor on said second transverse shaft, a shaft extending transversely of said second conveyor and rotatably mounted thereon at said third point, a sprocket wheel mounted on said last-named transverse shaft, a chain-type conveyor forming a continuous loop around both said second conveyor sprocket wheels and a diverter mechanism associated with said second conveyor at said third point for diverting objects from said second conveyor, said diverter mechanism comprising a deflecting board pivotally mounted on said second conveyor about the longitudinal axis thereof, a bottom beam a spaced distance below said deflecting board and extending transversely of said second conveyor, a first arm assemblage pivotally attached at one of its ends to said deflecting board at one side of said longitudinal axis and at its other end held in sliding contact with said bottom beam, a second arm assemblage pivotally attached at one of its ends to said deflecting board at the other side of said longitudinal axis and at its other end held in sliding contact with said bottom beam, said pivot attachments of each said arm assemblages being equal distant from said longitudinal axis, each said arm being of equal length and of greater length than the distance separating said deflecting board and said bottom beam, said other ends of said arm assemblages sloping inwardly towards said longitudinal axis when said deflecting board lies in a horizontal plane, elongated telescoping means joined at its one end to said first arm assemblage and at its other end to said second arm assemblage, and spring means on said telescoping means biasing said first and said second arm assemblages apart, whereby an object moving onto said second conveyor from said first conveyor is accelerated to a greater speed than said base speed and thus separated from other objects following in its wake, so that said objects do not become tangled at said diverter.

References Cited by the Examiner
UNITED STATES PATENTS

| | | | |
|---|---|---|---|
| 1,160,791 | 11/15 | Van Houten | 198—34 |
| 1,976,855 | 10/34 | McKee | 198—34 |
| 2,063,431 | 12/36 | Grayson | 198—185 |
| 2,260,724 | 10/41 | O'Brien | 30—254 |
| 2,639,024 | 5/53 | Kneer | 198—185 |
| 3,056,483 | 10/62 | Galloway | 198—34 |

SAMUEL F. COLEMAN, *Primary Examiner.*

WILLIAM B. LA BORDE, *Examiner.*